June 16, 1964

J. CURTIS 3,137,401

WRECKING CAR ATTACHMENT

Filed May 11, 1961

INVENTOR
Joseph Curtis
BY Albert H. Kirchner

ATTORNEY

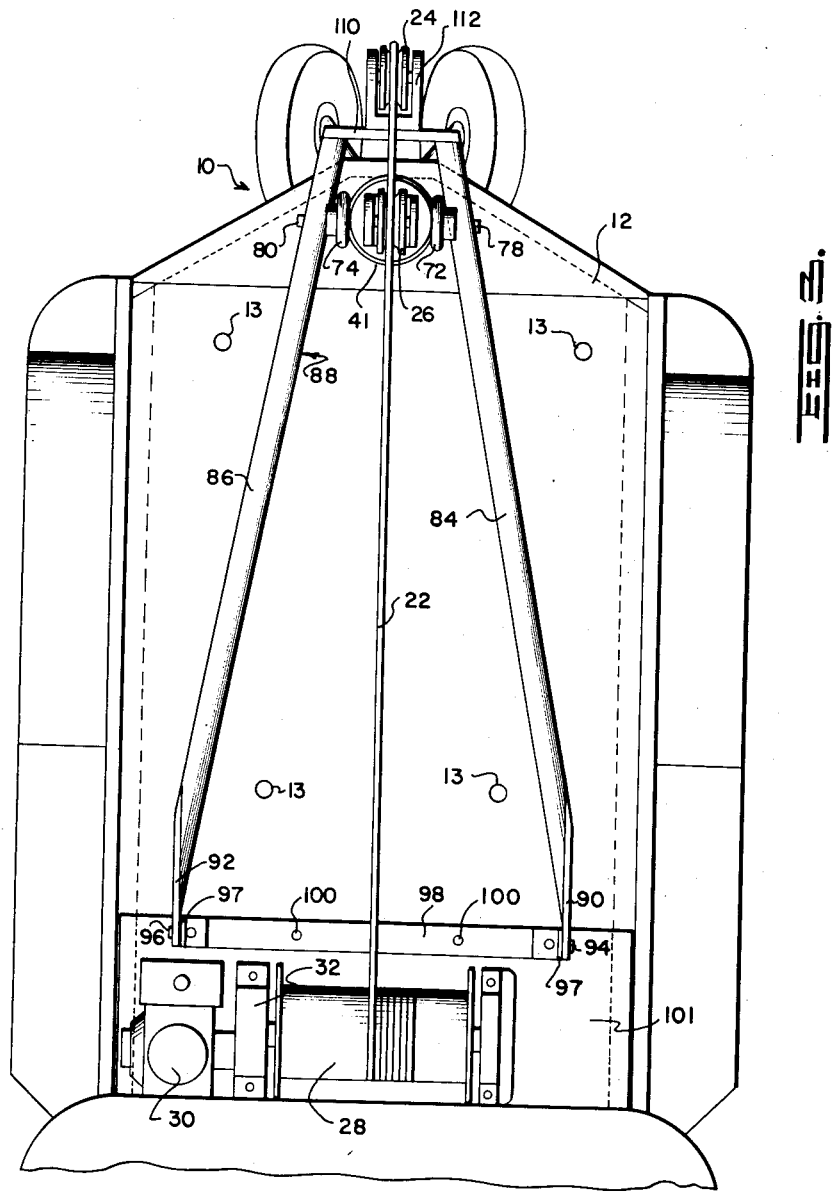

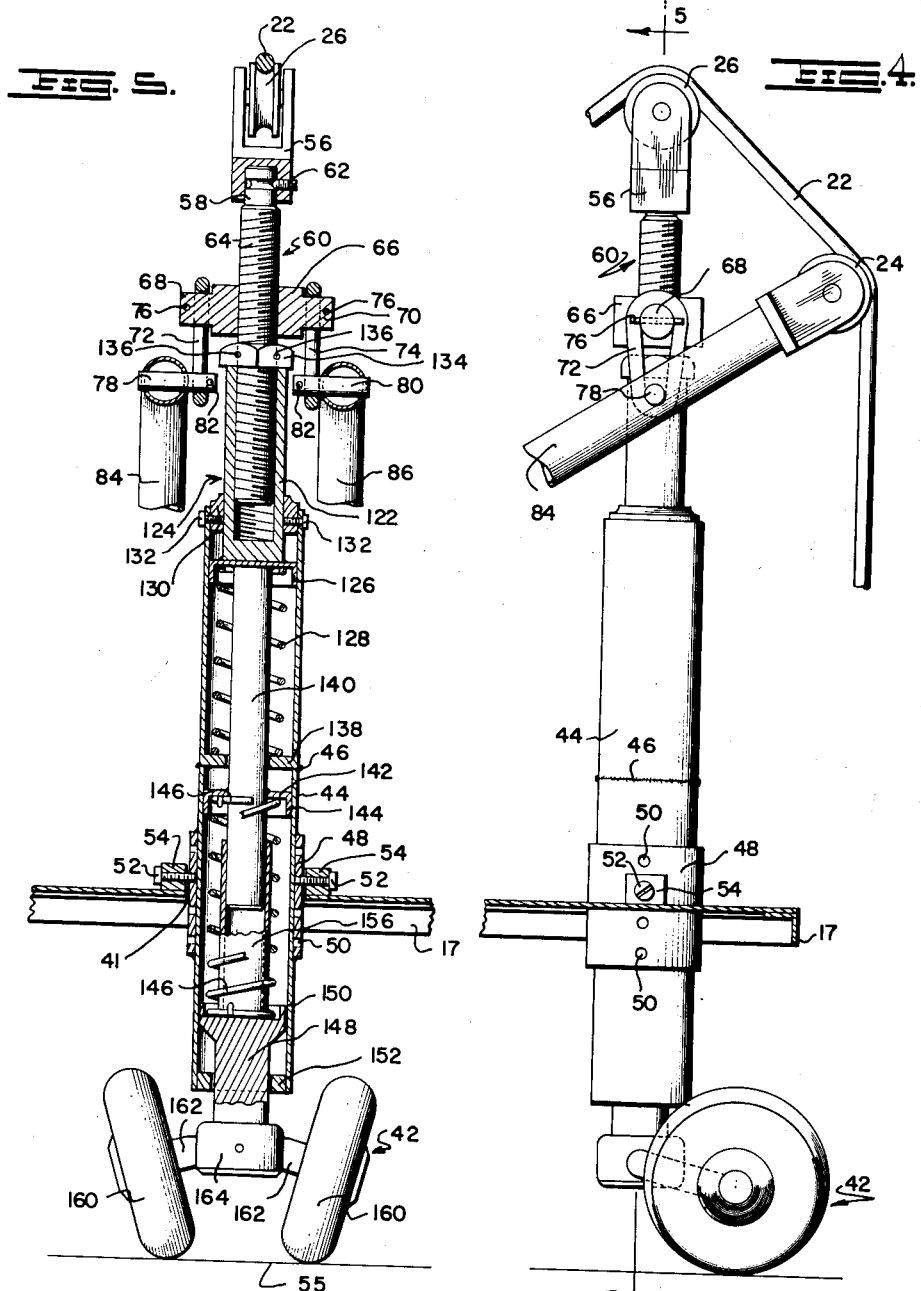

United States Patent Office 3,137,401
Patented June 16, 1964

3,137,401
WRECKING CAR ATTACHMENT
Joseph Curtis, 108 W. Allen St., Mechanicsburg, Pa.
Filed May 11, 1961, Ser. No. 109,356
7 Claims. (Cl. 214—86)

In its broader aspects this invention relates to apparatus for dividing a load to be transported by towing so as to apply portions of the load to two supports, in order to reduce the load on each support and provide for carrying a greater total load than the strength of either support alone could provide.

More particularly the invention relates to a wrecking car attachment for application to a conventional type of truck to permit the truck to raise and tow a greater portion of the weight of a disabled vehicle than the truck could support alone.

Heretofore, where a relatively light-weight truck has been used for towing a disabled vehicle, the maximum weight of vehicle which could be raised and supported was limited by the carrying capacity of the truck. The present invention provides a load-supporting assembly which increases the maximum weight of a disabled vehicle which can be raised and towed by a truck. According to the invention, a load-supporting and dividing assembly is provided for lifting a load, such as one end of a disabled vehicle, and dividing the weight so that only a portion thereof is carried by the truck and the remaining portion of the load is transmitted directly to ground-engaging wheels forming part of the assembly.

The load-supporting and dividing assembly of the invention can be applied in various situations where additional load or thrust bearing capacity in desired to supplement the capacity of an existing structure so as to increase the total capacity which the combination can carry.

A further object of the invention is to provide a load-carrying and dividing assembly that is adjustable to provide for lifting a load to various heights and for application to trucks having their beds located at various heights above the ground.

A further object of the invention is to provide a wrecking car assembly for attachment to a vehicle so that the vehicle can act to raise and tow other disabled vehicles of a great range in weights.

For a better understanding of the invention and its other objects, advantages, and details, reference is now made to the presently preferred embodiment which is shown, for purpose of illustration only, in the accompanying drawings incorporated in an attachment converting a conventional type of pick-up truck into a wrecking car.

In the drawings:

FIG. 3 is a top plan view of the apparatus shown in FIG. 1;

FIG. 4 is an enlarged fragmentary view of a portion of the load supporting and dividing apparatus shown in FIGS. 1 to 3; and, FIG. 5 is a vertical sectional view on the line 5—5 in FIG. 4.

Briefly stated, the invention includes a load-supporting and dividing assembly wherein the load, such as an elevated end portion of a disabled vehicle, is lifted by a hook attached to a flexible connector, such as a cable or chain. The connector is supported by a mast pivotally secured to the base plate of the assembly, and the base plate is mounted on a conventional type of truck. A wheel assembly is positioned at the bottom of the mast and engages the ground. The mast includes a staff which divides the load between two compression springs. One compression spring is supported by the base plate and the other compression spring rests on the wheel assembly. Thus, the load is divided between the wheel assembly and the bed of the towing vehicle, and the wrecking car function of the truck thus equipped is greatly increased over the capacity of specially constructed wrecking cars of similar size.

The mast can be raised and lowered with respect to the base plate. Also the mast can be made shorter or longer to accommodate various loads to be raised.

Figure 1:
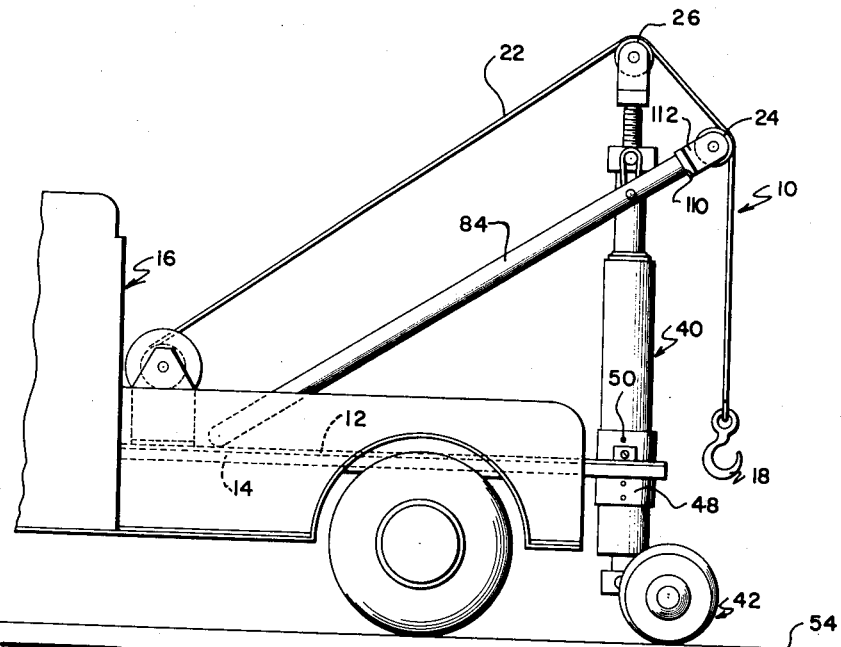
FIGURE 1 is a side elevational view of a wrecking car assembly according to the invention shown mounted in the rear of a conventional pick-up truck.
Figure 2:
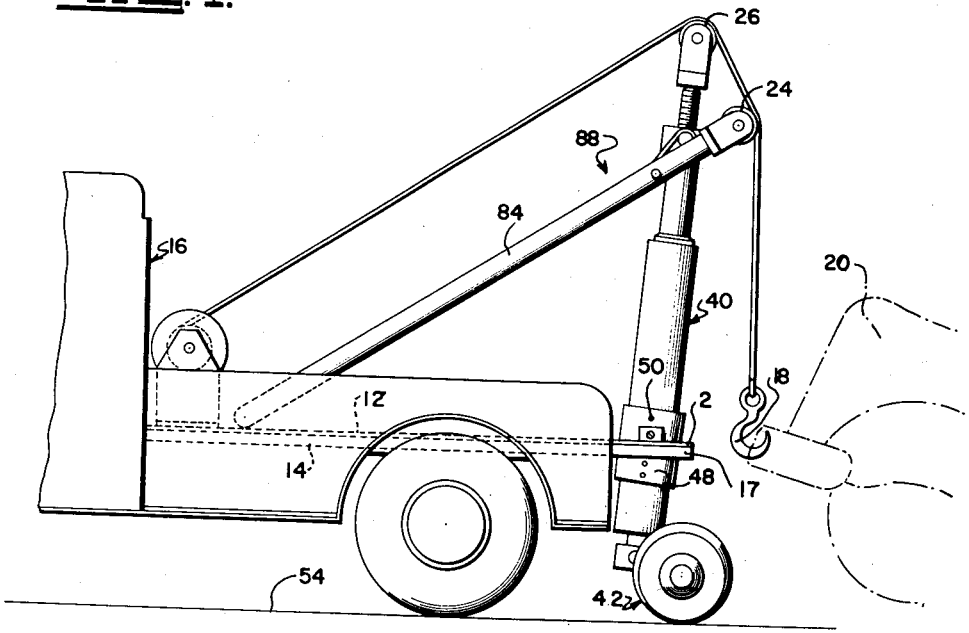
FIG. 2 is a side elevational view of the apparatus of FIG. 1 when lifting and towing a disabled automobile.

Referring to the drawings, a wrecking car assembly 10 is shown with a base plate 12 secured by bolts 13 to the bed 14 of a pick-up truck 16. An angle iron 17 trims the edge of the base plate 12 to stiffen and strengthen it. The wrecking car assembly includes a hook 18 for engaging a disabled vehicle 20 shown in FIG. 2. The hook 18 is secured to one end of a flexible connector 22 rove around a guide pulley 24 and load pulley 26 and winding around a winch 28 secured to base plate 12 and driven by a gasoline engine 30 through suitable reduction gearing 32.

A mast 40 stands through a slightly enlarged hole 41 in a portion of the base plate 12 which extends rearwardly beyond the rear edge of the truck bed 14 and is pivotally connected to the plate so as to provide for supporting the flexible connector 22 and for dividing the thrust of the load between the truck bed 14 and a carriage or wheel assembly 42 which projects from the lower end of the mast. The mast includes a cylinder 44 formed by upper and lower sections welded together at 46.

A short sleeve 48 surrounds a portion of the lower section of the cylinder 44 and is welded thereto. The sleeve has a series of holes 50 formed at vertically-spaced positions on opposite sides thereof. As best shown in FIG. 5, the cylinder 44 is pivotally secured to the base plate 12 by screws 52 passing through blocks 54 welded to the base plate 12 and extending into the holes 50. It will be seen that by passing the screws 52 through different pairs of the vertically-spaced holes 50, the vertical positioning of mast 40 with respect to the base plate 12 can be changed in order to accommodate trucks having beds located at various heights above the ground 55.

The load pulley 26 is rotatably journaled in a forked member 56 having an opening in its lower end receiving an upper terminal stud portion 58 of an adjusting compound screw 60. A set screw 62 extends through the forked member 56 and engages a groove in the stud 58 in order releasably to connect the forked member 56 to the stud 58.

The adjusting screw 60 has its upper portion 64 formed with a left-hand thread received in an opening formed in block 66 having trunnions 68 and 70 extending from the opposite sides thereof. Loop pivot links 72 and 74 surround and depend from the trunnions 68 and 70, respectively, and are held thereon by cotters 76. The lower ends of the links 72 and 74 surround stout pins 78 and 80 respectively and are held thereon by cotters 82. The pins 78 and 80 extend through diagonal guide posts 84 and 86 and are fixed thereto.

The guide posts 84 and 86 are part of a guide frame 88 supporting the guide pulley 24. The posts have their lower forward ends 90 and 92 pivotally secured by bolts 94 and 96, as shown in FIG. 3, to upstanding ears 97 of a bar 98 fixed, as by rivets 100, to slab 101 fixed to the forward end zone of the base plate 12. The upper rear ends of the guide posts 84 and 86 are connected by a plate 110 to which is secured a forked member 112 in which is journaled the guide pulley 24. The loop pivot links 72 and 74 pivotally connect the guide posts 84 and 86 to the mast 40 in order to provide for angular adjustment of the members when the assembly lifts loads of various weights.

Referring to FIG. 5, the lower portion 120 of compound adjusting screw 60 is threaded with a right-hand thread, opposite to the left-hand thread of the upper portion 64 and is meshed in the internally-threaded riser tube 122 forming a portion of a reciprocable staff 124 including a cap 126 secured to the lower end of riser tube 122 and receiving the upper end of top compression spring 128. A bushing 130 slidably receives the riser tube 122 and is held in position by screws 132 extending through cylinder 44. The reciprocable staff 124 also includes screw 60. For rotating screw 60, a polygonal enlargement 134 is fixed to the screw for engagement by a wrench and may be provided with radial holes 136 for receiving a turning rod.

Top compression spring 128 has its lower end bearing against a slat 138 integral with cylinder 44. A rod 140 is integral with the staff 124 and extends downwardly from cap 126. An annular abutment 142 having a downwardly extending flange 144 is secured to the lower portion of rod 140. This abutment 142 receives the upper end of bottom compression spring 146 which has its lower end bearing against the enlarged top of the upstanding spindle 148 of wheel assembly 42. The spindle 148 is slidable in the cylinder 44 and its enlarged top has a flange 150 retaining the lower end of bottom spring 146. A base bushing 152 is fixed in cylinder 44 and retains the spindle 148 within the cylinder 44. A sleeve 156 extends upwardly from spindle 144 and slidably receives the rod 140 for maintaining the alignment of the rod and the compression spring 146.

The wheel assembly 42 includes a pair of caster type wheel and tire assemblies 160 journaled on stub axles 162 secured to a boss 164 at the lower end of the spindle 148.

In operating the illustrated embodiment of the invention, the hook 18 is engaged with the bumper, axle or other convenient member of a disabled vehicle 20 and the gasoline engine 30 is started to rotate winch 28 and apply tension to the flexible connector 22 to lift the adjacent end of the vehicle 20. The thrust downwardly through load pulley 22 is divided at the cap 126 between the rod 140 and the top compression spring 128. That portion of the thrust which is carried by the top compression spring 128 is transmitted to flange 138, through the cylinder 44, sleeve 48, screws 52, base plate 12 and through the bed 14 of the truck 16 to the ground 55.

The portion of the thrust which is carried by the rod 140 is transmitted to abutment 142, bottom compression spring 146 to spindle 148 and through wheels 160 to the ground 55. It will be seen that the division of the load will depend on factors including the relative compressibility of the two compression springs 128 and 146.

As the vehicle 20 is lifted, the assembly 10 shifts with the mast 40 pivoting with respect to base plate 12 and guide frame swinging on loop pivot links 72 and 74.

When it is desired to lengthen the mast 40, a wrench or rod is applied to the enlargement 134 and the screw 60 is rotated to extend it upwardly out of the riser tube 122. This rotation causes the block 66 to rise on the upper threaded portion 64 of the screw 60. At the same time the entire screw 60 rises out of the tube 122. By this compound screw action, the block 66 rises twice as fast as the load pulley 26. The loop pivot links lift the guide frame 88 so that the guide pulley 24 will be raised to an appropriate position.

Thus the invention provides a load carrying and dividing device for increasing the working capacity of various devices and vehicles.

While the presently preferred embodiment of the invention has been illustrated and described, it will be recognized that the invention can be otherwise variously embodied and practiced within the scope of the more broadly worded of the following claims.

I claim:

1. A load-supporting and dividing assembly comprising a mast having a load pulley at its upper end, a guide frame connected to said mast by at least one link member, said link member being pivotally connected to both said mast and said guide frame, a guide pulley at one end of said guide frame, a base member, said guide frame having its other end pivotally connected to said base member, said mast including a cylinder connected to said base member, a staff reciprocable in said cylinder and having said load pulley mounted at its upper end, a wheel assembly at the bottom of said cylinder, a first compression spring having one end pressing against a portion of said staff and its other end pressing against a portion of said cylinder, and a second compression spring having one end pressing against a portion of said staff and its other end pressing against said wheel assembly.

2. The invention as set forth in claim 1 wherein said staff includes a riser tube threaded in one hand, an adjusting compound screw having one end threaded in the same hand as said riser tube and received therein, said adjusting screw having its opposite end threaded in the opposite hand, a block having an opening therein threadedly receiving said opposite end of said adjusting screw, said link member being pivotally connected to said block, and said adjusting screw being formed with means for engaging and rotating said screw.

3. The invention as set forth in claim 2 wherein said block has trunnions extending from opposite sides thereof, said guide frame includes two guide posts pivotally secured to said base member and converging toward each other, a rod extending outwardly from each of said guide posts, and a pair of loop pivot links each extending around one trunnion and one of said rods.

4. The invention as set forth in claim 1 wherein said staff includes an upper restraining member abutting the upper end of said first compression spring, a rod extends through said first compression spring, an abutment fixed to said rod below the lower end of said first compression spring, the upper end of said second compression spring pressing against said abutment, said wheel assembly including a base pintle slidably received in the lower end of said cylinder, a sleeve extending upwardly from said base pintle and slidably receiving the lower end of said rod, and said second compression spring having its lower end abutting against said base pintle.

5. A wrecking car assembly for attachment to a vehicle comprising a base plate positionable upon the bed of the vehicle, a cylinder pivoted to the rear portion of said base plate, a staff slidable in said cylinder and extending above the upper end of said cylinder, a load pulley rotatably mounted in the upper portion of said staff, a winch mounted on said base plate, a guide frame secured to said base plate and extending inclinedly upwardly and rearwardly, a guide pulley rotatably mounted in one end of said guide frame, a flexible connector extending from said winch around said load pulley and said guide pulley, a hook secured to said flexible connector, a first compression spring surrounding the lower end of said staff and having its upper end pressing against a portion of said staff and its lower end pressing against a portion of said cylinder, a second compression spring positioned in said cylinder and having its upper end pressing against a portion of said staff, and a wheel assembly at the lower end of said cylinder, the lower end of said second compression spring pressing against said wheel assembly.

6. A wrecking car assembly as set forth in claim 5 wherein said staff includes a riser tube having an internally threaded bore, an adjusting screw having its lower end threaded and engaging the threads of said bore, said adjusting screw having its upper portion threaded in the opposite direction to the threads on the lower portion of said screw, a block having a threaded bore receiving said upper portion of said adjusting screw, and link means pivotally connecting said guide frame to said block.

7. Towing car apparatus for supporting and dividing a load comprising a towing car having supporting wheels and a frame supported thereby, a mast assembly standing upright through said frame and comprising a first member bearing on the frame for transmitting thereto loads imposed on said member and a second member having a ground-engaging wheel at its lower end, means at the top of said mast assembly for receiving the suspended load of a vehicle to be towed, and separate thrust means interposed between said means and said first and second members whereby the weight of the suspended vehicle is divided between the supporting wheels of the towing car and the ground engaging wheel of the mast assembly, said first member being a cylinder and said second member comprising rod means telescoped within the cylinder having its upper portion projecting above the cylinder and surmounted by the means for receiving the suspended load of the vehicle to be towed and having one of said separate thrust means interposed between its lower end and the ground engaging wheel of the mast assembly.

References Cited in the file of this patent

UNITED STATES PATENTS

| | | |
|---|---|---|
| 1,381,780 | Allen | June 14, 1921 |
| 1,403,687 | Hillstrom | Jan. 17, 1922 |
| 1,630,800 | Page | May 31, 1927 |
| 2,563,370 | Reese | Aug. 7, 1951 |